United States Patent
Toral Vazquez et al.

(10) Patent No.: US 10,730,602 B2
(45) Date of Patent: Aug. 4, 2020

(54) AIRCRAFT WITH A PROTECTIVE SHIELD AGAINST AN ENGINE BLADE RELEASE

(71) Applicants: Airbus Operations S.L., Getafe (ES); Airbus Operations SAS, Toulouse (FR)

(72) Inventors: Javier Toral Vazquez, Getafe (ES); Esteban Martino Gonzalez, Getafe (ES); Diego Folch Cortes, Getafe (ES); Pablo Goya Abaurrea, Getafe (ES); Vasilis Votsios, Toulouse (FR); Michel Fouinnetau, Toulouse (FR); Sylvain Roumegas, Toulouse (FR); Wolfgang Brochard, Toulouse (FR)

(73) Assignees: AIRBUS OPERATIONS S.L., Getafe (ES); AIRBUS OPERATIONS S.A.S., Toulouse (FR)

( * ) Notice: Subject to any disclaimer, the term of this patent is extended or adjusted under 35 U.S.C. 154(b) by 540 days.

(21) Appl. No.: 15/182,672

(22) Filed: Jun. 15, 2016

(65) Prior Publication Data
US 2016/0362167 A1    Dec. 15, 2016

(30) Foreign Application Priority Data
Jun. 15, 2015 (EP) .................................. 15382311

(51) Int. Cl.
*B64D 37/04* (2006.01)
*B64D 27/10* (2006.01)
(Continued)

(52) U.S. Cl.
CPC ................ *B64C 1/068* (2013.01); *B64C 1/06* (2013.01); *B64D 27/10* (2013.01); *B64D 27/14* (2013.01);
(Continued)

(58) Field of Classification Search
CPC .......... B64D 37/04; B64D 37/08; B64D 7/00; B64D 11/02; B64D 45/00; B64C 3/34;
(Continued)

(56) References Cited

U.S. PATENT DOCUMENTS 2,623,721 A * 12/1952 Harrington ............ B64D 37/06
244/135 R
6,683,783 B1 * 1/2004 Smalley ................. B01J 19/081
361/502
(Continued)

FOREIGN PATENT DOCUMENTS

DE        102004015319 A1 * 10/2005 ............. B64D 37/04
EP        2610164        7/2013
(Continued)

OTHER PUBLICATIONS

European Search Report, dated Nov. 17, 2015, priority document.

*Primary Examiner* — Richard R. Green
(74) *Attorney, Agent, or Firm* — Greer, Burns & Crain, Ltd.

(57) ABSTRACT

An internal shield inside the rear fuselage of an aircraft having a propulsion system formed by two engines mounted on each side of it. The internal shield is located in a suitable place inside the rear fuselage for covering the possible trajectories of fragments detached from one of the engines in a failure event that would impact critical elements of the opposite engine. The internal shield comprises an ensemble of fluid containers belonging to aircraft sub-systems, such as, particularly, the potable water and waste water sub-systems, with enough fluid for providing the energy absorption capability required for stopping the fragments. An aircraft having the internal shield is also disclosed.

18 Claims, 3 Drawing Sheets

(51) Int. Cl.
　　　*B64D 27/14*　　　(2006.01)
　　　*B64C 1/06*　　　(2006.01)
　　　*B64D 45/00*　　　(2006.01)
　　　*B64C 1/00*　　　(2006.01)

(52) U.S. Cl.
　　　CPC ............. *B64D 37/04* (2013.01); *B64D 45/00* (2013.01); *B64C 2001/0072* (2013.01); *Y02T 50/43* (2013.01)

(58) Field of Classification Search
　　　CPC ........... B64C 1/062; B64C 1/068; B64C 1/10; B64C 1/16; B64C 1/26; B64C 5/06; B64G 1/52; B64G 1/54; B64G 1/543; B64G 1/546; B64G 1/56
　　　See application file for complete search history.

(56) References Cited

U.S. PATENT DOCUMENTS

| | | |
|---|---|---|
| 2002/0134887 A1 | 9/2002 | Lin et al. |
| 2005/0230554 A1 | 10/2005 | Schoene |
| 2009/0140096 A1 | 6/2009 | Verde |
| 2011/0233335 A1 | 9/2011 | Vibue Santolalla et al. |
| 2013/0099057 A1 | 4/2013 | Martino et al. |
| 2013/0214090 A1 | 8/2013 | Folch Cortes et al. |
| 2014/0339367 A1* | 11/2014 | Sankrithi ............... B64D 37/04 244/135 R |

FOREIGN PATENT DOCUMENTS

| | | | |
|---|---|---|---|
| WO | WO-2008086587 A2 * | 7/2008 | ............. B64D 37/04 |
| WO | 2009068638 | 6/2009 | |

* cited by examiner

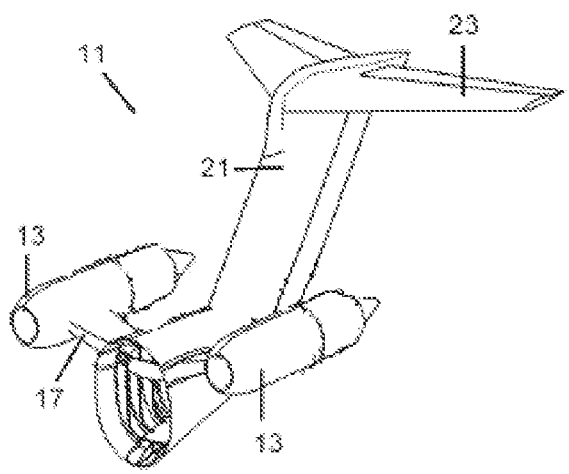
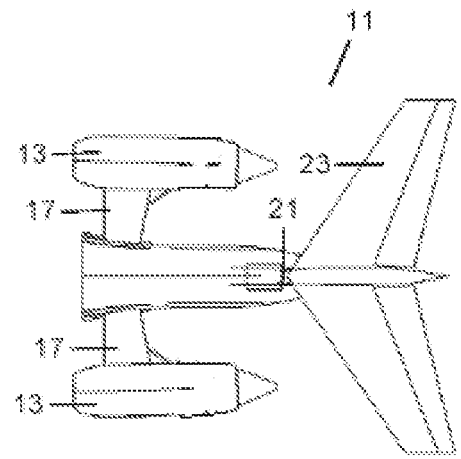
FIG. 1a
Prior Art
FIG. 1b
Prior Art
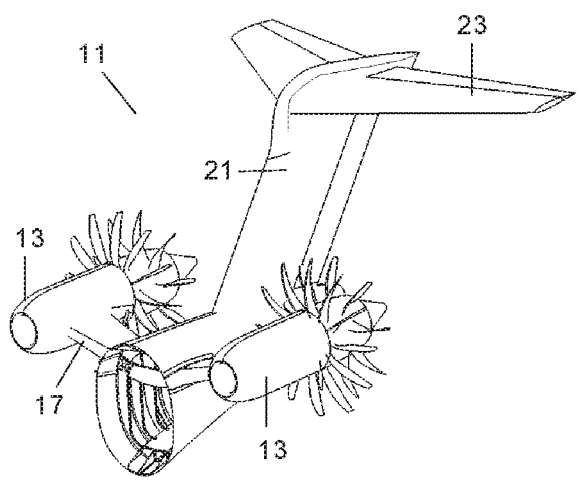
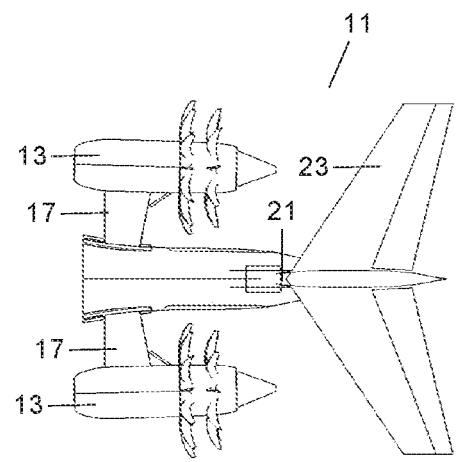
FIG. 2a
Prior Art
FIG. 2b
Prior Art

AIRCRAFT WITH A PROTECTIVE SHIELD AGAINST AN ENGINE BLADE RELEASE

CROSS-REFERENCES TO RELATED APPLICATIONS

This application claims the benefit of the European patent application No. 15382311.7 filed on Jun. 15, 2015, the entire disclosures of which are incorporated herein by way of reference.

FIELD OF THE INVENTION

The present invention relates to an aircraft equipped with fuselage-mounted engines and, more particularly, to the protection of the engines against the risk of being impacted by a part detached from the opposite engine in case of a failure.

BACKGROUND OF THE INVENTION

There are known aircraft equipped with two engines mounted on the rear fuselage such as those shown in FIGS. 1a, 1b, 2a, 2b and 3.

FIGS. 1a and 1b show an aircraft with two turbofan engines 13 attached to the rear fuselage 11 by means of pylons 17 and an empennage comprising a vertical tail plane 21 and an upper horizontal tail plane 23 behind the propulsion system.

FIGS. 2a and 2b show an aircraft with two engines with unducted propeller blades 13 attached to the rear fuselage 11 by means of pylons 17 and an empennage comprising a vertical tail plane 21 and an upper horizontal tail plane 23 behind the propulsion system.

FIG. 3 shows an aircraft with two turbofan engines 13 attached directly to the rear fuselage 11 and an empennage comprising a vertical tail plane 21 and an upper horizontal tail plane 23 behind the propulsion system.

In these aircraft, failure events such as a Blade Release (BR) event, i.e., an event where an external blade of one engine with unducted propeller blades comes off and hits the fuselage, or an Uncontained Engine Rotor Failure (UERF) event, i.e., an event where a part of the internal rotors of the engine breaks, it is released and hits the fuselage, can generate large damages on the fuselage and also in the opposite engine. In the last case, the effects can be catastrophic.

Although engine manufacturers are making efforts to reduce the probability of these failure events, experience shows that UERF and BR events that can lead to catastrophic events continue to occur.

The certification requirements are very restrictive and are driving both fuselage and systems architectures in order to fulfill safety requirements.

As is well known, weight is a fundamental aspect in the aeronautic industry and therefore there is a trend to use structures of a composite material instead of a metallic material even for primary structures such as fuselages.

The composite materials that are most used in the aeronautical industry comprise fibers or fiber bundles embedded in a matrix of thermosetting or thermoplastic resin, in the form of a preimpregnated or "prepreg" material. Their main advantages refer to:

Their high specific strength with respect to metallic materials. It is the strength/weight equation.
Their excellent behavior under fatigue loads.
The possibilities of structural optimization thanks to the anisotropy of the material and the possibility of combining fibers with different orientations, allowing the design of the elements with different mechanical properties to be adjusted to the different needs in terms of applied loads.

The disadvantage of the usual composite materials made of carbon fibers compared to conventional light weight metallic materials like aluminum, is their lower impact resistance and damage tolerance capabilities. No plasticity behavior as on metallic materials is present in composite materials and they are not able to absorb high strain energy amounts when deforming.

There is therefore a need for aircraft structures capable of satisfying the safety requirements, particularly when the fuselage is made up of composite materials.

EP 2610164 A1 discloses an aircraft provided with an internal shield intended to efficiently protect an engine (including systems such as electrical generation and fuel feed that are critical ones) from the risk of being damaged by a detached part from the opposite engine. A drawback of the internal shield is that increases significantly the weight of the aircraft.

The present invention is addressed to the solution of this drawback.

SUMMARY OF THE INVENTION

In one aspect, the invention provides an internal shield inside the rear fuselage of an aircraft, located in a suitable place for covering the possible trajectories of fragments detached from one engine in a failure event that would impact critical elements of the opposite engine. The internal shield comprises an ensemble of fluid containers belonging to aircraft sub-systems with enough fluid for providing the energy absorption capability required for stopping the fragments. As the internal shield is mainly made with elements of existing sub-systems in the aircraft, the weigh increase involved by its inclusion in the aircraft is small.

In another aspect, the invention provides an aircraft comprising a propulsion system formed by two engines mounted on each side of its rear fuselage and an internal shield located inside the rear fuselage in a suitable place for covering the possible trajectories of fragments detached from one of the engines in a failure event that would impact the critical elements of the opposite engine. The internal shield comprises an ensemble of fluid containers belonging to aircraft sub-systems with enough fluid for providing the energy absorption capability required for stopping the fragments.

In an embodiment the fluid containers belong to the potable water and/or to the waste water sub-systems of the aircraft and they are, preferably, arranged, staggered in a first column of potable water containers and in a second column of waste water containers. These two columns can be particularly located at both sides of the vertical symmetry plane of the rear fuselage of the aircraft and arranged so that the internal shield always contains, globally, the same volume of water distributed whether in the potable water column or in the waste water column in a manner that a fragment detached from one of the engines would be stopped by a potable water container or a waste water container partially or totally filled with, respectively, potable water or waste water.

Other characteristics and advantages of the present invention will be clear from the following detailed description of embodiments illustrative of its object in relation to the attached figures.

BRIEF DESCRIPTION OF THE DRAWINGS

FIGS. 1a and 1b are, respectively, schematic perspective and plan views of the rear part of an aircraft whose fuselage is equipped with turbofan engines connected to the fuselage by pylons.

FIGS. 2a and 2b are, respectively, schematic perspective and plan views of the rear part of an aircraft whose fuselage is equipped with engines with unducted propeller blades connected to the fuselage by pylons.

DETAILED DESCRIPTION OF THE PREFERRED EMBODIMENTS

The invention is applicable to any kind of aircraft equipped with two engines mounted on each side of the rear fuselage, such as those illustrated in FIGS. 1a, 1b, 2a, 2b and 3.

In these aircraft, in the case of an engine failure, the critical elements of the opposite engine (those elements that cannot be lost when an engine fails, such as the electrical generation, the engine fuel feed and the engine blades) may be easily impacted by a detached part of one engine because of their proximity and the lack of strong and massive structural items between the two engines. The involved risk is a failure of the opposite engine which would lead to a catastrophic event.

This risk is not avoided by impact resistant and damage tolerant fuselages, such as those disclosed in WO 2009/068638 and US 2011/233335, because their main objective is not stopping completely any detached part of an engine that damages the fuselage, but to provide the fuselage with the strength needed for a "get home mission" with one operating engine.

Figure 3:
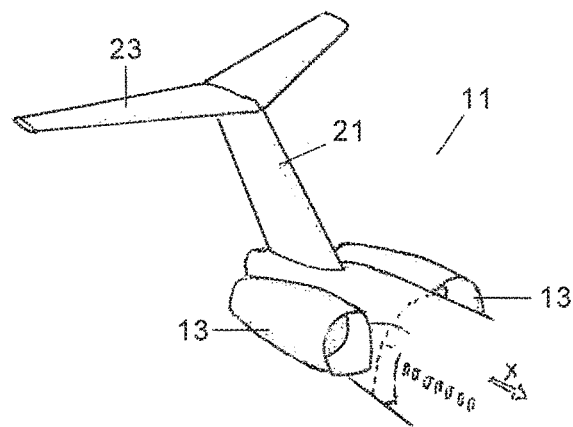
FIG. 3 is a perspective view of the rear part of an aircraft whose fuselage is equipped with turbofan engines connected directly to the fuselage.
Figure 4:
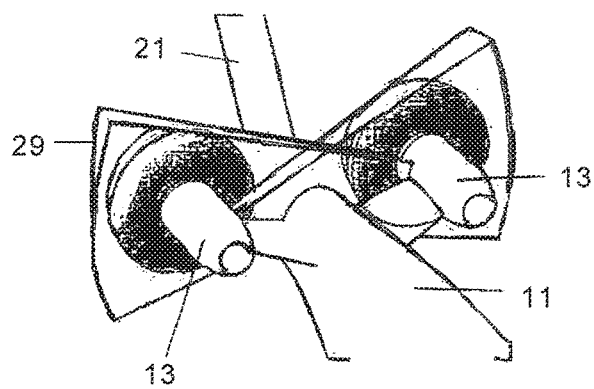
FIG. 4 is a perspective view of the rear part of an aircraft showing possible trajectories of detached fragments from one engine that can impact on the opposite engine.
Figure 5:
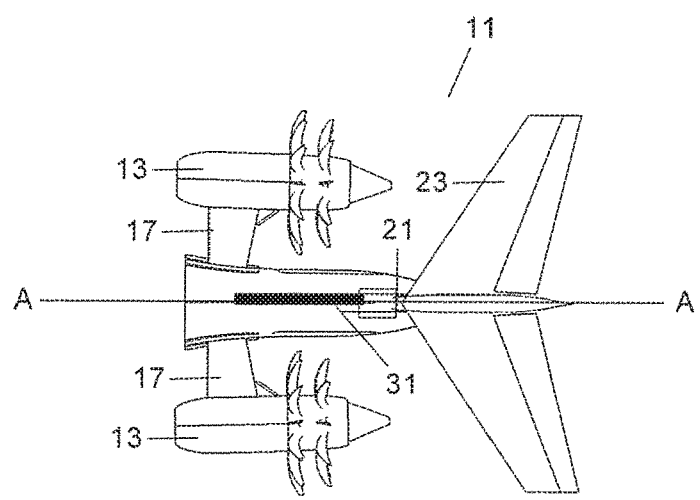
FIG. 5 is a schematic plan view of the rear part of an aircraft whose fuselage is equipped with engines with unducted propeller blades connected to the fuselage by pylons and that includes an internal shield guarding against an engine blade release.

The set of possible trajectories 29 (see FIG. 4) of detached fragments to be considered is obtained associating to a pre-selection of fragments, taking into account all engine stages (rotor, turbine, propellers), and their possible trajectories in a failure event.

The strength of the internal shield depends on the level of energy of the fragments that need to be stopped according to the certification requirements and other relevant factors.

The invention proposes an internal shield 31 comprising fluid containers of one of the fluids used in an aircraft sub-system with enough fluid for providing the energy absorption capability required for stopping the fragments detached from one of the engines 13 in a failure event that would impact on critical elements of the opposite engine, profiting that a fluid is a massive and good means for absorbing the energy of the fragments. The internal shield 31 shall be located in a suitable position to stop the fragments.

In an embodiment, the fluid containers belong to the potable water and waste water subsystems of the aircraft. It is considered that a configuration of the subsystems with containers in the rear part of the aircraft (an unpressurised zone) can satisfy the typical functional requirements of the sub-systems and also to maintain enough fluid in the internal shield 31 to guarantee the required energy absorption capability.

Figure 6A:
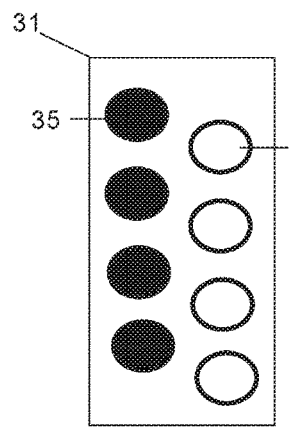
FIGS. 6a, 6b and 6c are schematic sectional views illustrating an internal shield formed by fluid containers according to the present invention in three different stages of a flight.
Figure 6B:
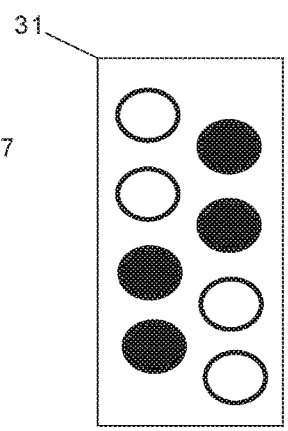
Figure 6C:
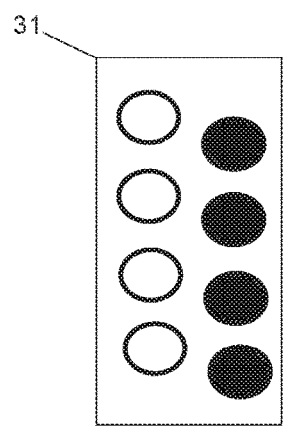

In an embodiment, the internal shield 31 is formed by potable water containers 35 in a first column at the left side and waste water containers 37 in a second column at the right side, arranged staggered. The potable water and waste water subsystems are arranged for managing the transfer of water so that, for example, at the beginning of a flight all the potable water containers 35 would be filled as illustrated in FIG. 6a; at a later time, the first two potable water containers 35 would be empty and the first two waste water containers 37 would be filled as shown in FIG. 6b. At the end of the flight all potable water containers 35 would be empty and all waste water containers 37 would be filled as shown in FIG. 6c. Therefore, the internal shield 31 always contains, globally, the same volume of liquid and this volume is distributed in both columns in a manner that covers the space affected by any detached fragments of an engine.

Figure 7:
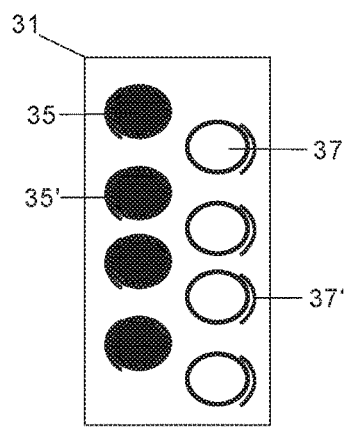
FIG. 7 is a schematic sectional view illustrating an internal shield formed by fluid containers according to the present invention that include a Kevlar skin in the outer lateral sides of the containers.

The potable and waste water containers 35, 37 are, preferably, cylindrical containers arranged parallel to the vertical symmetry plane A-A of the rear fuselage. They may be covered with thin composite Kevlar (poly-paraphenylene terephthalamide) type skins 35', 37' (see FIG. 7) in their lateral outer sides in order to spread the dynamic load on the containers 35, 37 on wider area.

In another embodiment, the internal shield 31 may comprise fuel containers duly protected against explosion risks.

Figure 8:
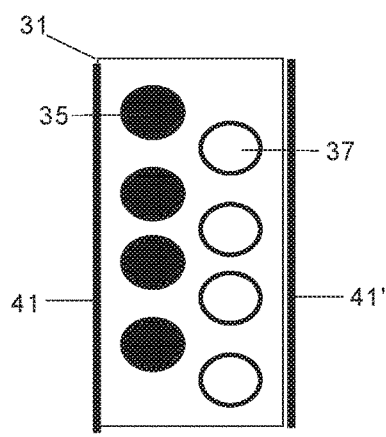
FIG. 8 is a schematic sectional view illustrating an internal shield according to the present invention that includes Kevlar layers on its sides facing the engines.

In another embodiment the internal shield 31 includes, as shown in FIG. 8, two layers of Kevlar 41, 41' arranged at both its sides, so as to cover the ensemble of fluid containers 35, 37. Although FIG. 8 shows the same arrangement of containers 35, 37 of FIGS. 6a, 6b, 6c and 7, the internal shield 31 may comprise an ensemble of fluid containers arranged differently.

The internal shield 31 is preferably located in a central position occupying a space at both sides of the vertical plane of symmetry A-A that covers the possible trajectories of the fragments.

The main advantage of the shield of the invention with respect to the shield disclosed in EP 2610164 A1 is that does not involve a significant weight increase of the aircraft weight due to the use of means of aircraft sub-systems.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An internal shield positioned inside the rear fuselage of an aircraft having a propulsion system formed by two engines comprising at least one of propeller blades or internal rotors, the two engines being mounted on each side of the rear fuselage of the aircraft opposite one another; the rear fuselage having a vertical symmetry plane; the rear fuselage being made of a composite material; the internal shield comprising:
an ensemble of fluid containers located inside the rear fuselage in a suitable place for covering possible trajectories of fragments detached from one of the engines in a failure event that would impact critical elements of the opposite engine including a region comprising a lateral plane encompassing said propeller blades or internal rotors;
the fluid containers comprising elements of aircraft sub-systems, and being configured to have sufficient fluid capacity for providing an energy absorption capability required for stopping said fragments.

2. The internal shield according to claim 1, wherein said fluid containers belong to at least one of the potable water or the waste water sub-systems of the aircraft.

3. The internal shield according to claim 2, wherein said aircraft has a front to rear longitudinal axis and said fluid containers are arranged in a first longitudinal column of potable water containers and in a second longitudinal column of waste water containers staggered longitudinally relative to the first column of potable water containers.

4. The internal shield according to claim 3, wherein said potable water and waste water containers are covered by poly-paraphenylene terephthalamide skins in their outer lateral sides.

5. The internal shield according to claim 3, wherein said containers each have a cylindrical shape, each cylinder having a vertical axis.

6. The internal shield according to claim 3, wherein the first column of potable water containers and the second column of waste water containers are located at opposite sides of the vertical symmetry plane.

7. The internal shield according to claim 1, wherein said fluid containers belong to the fuel sub-system of the aircraft.

8. The internal shield according to claim 1, further comprising two poly-paraphenylene terephthalamide layers, one at each lateral side of the ensemble of fluid containers.

9. An aircraft comprising:
a propulsion system formed by two engines mounted on each side of its rear fuselage;
the rear fuselage having a vertical symmetry plane;
the rear fuselage being made of a composite material;
an internal shield located inside the rear fuselage in a suitable place for covering possible trajectories of fragments detached from one of said engines in a failure event that would impact the critical elements of the opposite engine including a region comprising a lateral plane encompassing at least a portion of said engines;
the internal shield comprising an ensemble of fluid containers belonging to aircraft sub-systems, and being configured to have sufficient fluid capacity for providing an energy absorption capability required for stopping said fragments.

10. Aircraft according to claim 9, wherein said fluid containers belong to at least one of the potable water or waste water sub-systems.

11. The aircraft according to claim 10, wherein:
said aircraft has a front to rear longitudinal axis and the ensemble of fluid containers comprises potable water containers and waste water containers arranged longitudinally staggered in, respectively, a first and a second longitudinal column;
the potable water and waste water sub-systems are configured and arranged so that the internal shield maintains, globally, the same volume of liquid distributed, whether in the first column or in the second column, in a manner that a fragment detached from one of said engines would be stopped by at least one of a potable water container or a waste water container partially or totally filled with, respectively, potable water or waste water.

12. The aircraft according to claim 11, wherein said potable water and waste water containers are covered by a poly-paraphenylene terephthalamide skin in their outer lateral sides.

13. The aircraft according to claim 11, wherein said containers have a cylindrical shape with a vertical axis.

14. The aircraft according to claim 11, wherein the first and second columns of, respectively, potable water containers and waste water containers are located at opposite sides of the vertical symmetry plane.

15. The aircraft according to claim 9, wherein said fluid containers belong to the fuel subsystem of the aircraft.

16. The aircraft according to claim 9, wherein the internal shield further comprises two poly-paraphenylene terephthalamide layers on their sides facing the engines.

17. The aircraft according to claim 9, wherein said two engines are engines with unducted propeller blades, turbofan engines, or propfan engines mounted on the rear fuselage by means of pylons.

18. The aircraft according to claim 9, wherein said two engines are turbofan engines attached directly to the rear fuselage.

* * * * *